Sept. 28, 1965     W. E. BOUDRIE     3,208,773

INSULATED TUBE COUPLING

Filed June 5, 1963

INVENTOR.
Warren E. Boudrie

BY
ATTORNEY.

3,208,773
INSULATED TUBE COUPLING
Warren E. Boudrie, Fairport, N.Y., assignor to the United States of America as represented by the United States Atomic Energy Commission
Filed June 5, 1963, Ser. No. 285,845
3 Claims. (Cl. 285—18)

The invention relates to a tube coupling and particularly an electrically insulating coupling for high pressure tubing.

It has been a problem in prior metallic pipe and tube coupling apparatus in which there is a difference in potential between the tubes or pipes which are coupled that an electrolytic corrosion of the coupling takes place, which will in time cause a failure of the coupling apparatus. Many of the apparatus do not in general operate effectively at high pressures due to discontinuities in the tube surfaces that cause turbulences within the couplings. Still further, prior coupling apparatus which utilized some form of insulative or sealing material would, after repeated operation of the device, break down due to wear on this material caused by turning or rubbing the material against metallic parts.

It is an object of this invention to provide a tube coupling apparatus in which one tube is electrically insulated from the other tube.

Another object of this invention is to provide a tube coupling apparatus in which a high pressure and/or temperature gas or liquid can be contained without leakage or turbulence.

A still further object of the present invention is to provide a tube coupling apparatus which is simple in operation and assembly.

Finally, it is an object of the invention to provide a tube coupling apparatus which can be repeatedly assembled and disassembled without damage to its parts.

Various other objects and advantages appear from the following description of one embodiment of the invention and the most novel features will be particularly pointed out hereinafter in connection with the appended claims and drawings wherein:

Figure 2:
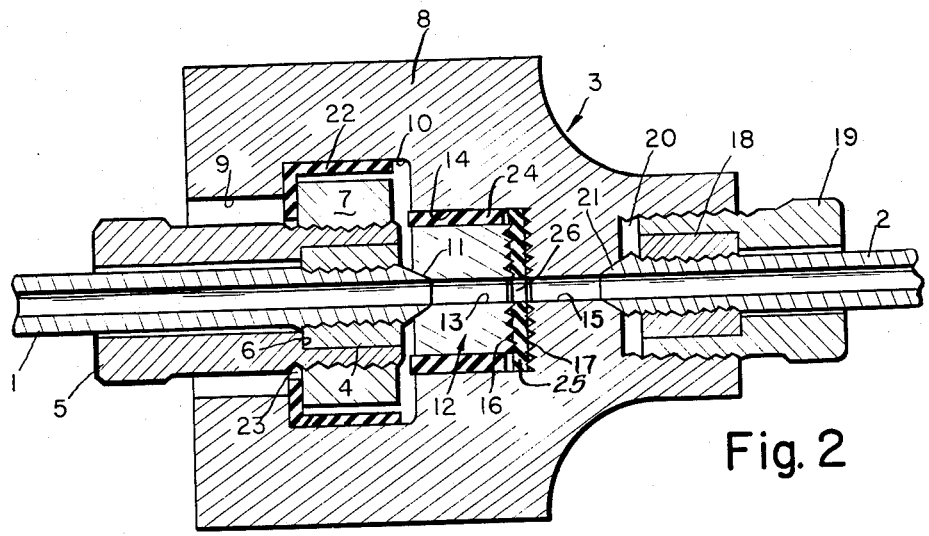
FIGURE 2 is a sectional view of FIGURE 1.
Figure 1:
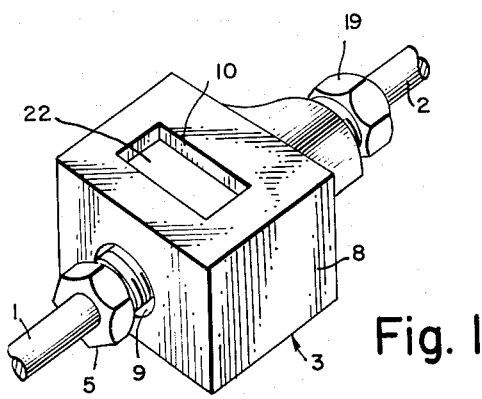
FIGURE 1 is a perspective view of one embodiment of this invention.

In a preferred embodiment of this invention as illustrated by FIGURE 1 and FIGURE 2 of the drawing, metallic tube 1 and metallic tube 2 are coupled together with the coupling 3, so that the corresponding inner surfaces of tubes 1 and 2 form a continuous axially aligned circular surface of constant diameter within the coupling 3, while tubes 1 and 2 remain electrically isolated from each other.

One end of tube 1 is threadedly engaged to collar 4 which is rotatably mounted in gland. Gland 5 has a flat annular shoulder 6 which is disposed opposite the rearward face of collar 4. Gland 5, by a series of external threads, is in turn in threaded engagement with metallic block 7 which may be inserted into housing 8 by way of slot 10, running through housing 8 and opening 9 and perpendicular to the axis of opening 9. Gland 5 is centered in opening 9 of a metallic housing 8 and is in spaced relationship to the side of said opening.

Further, tube 1 has a chamfered end portion 11 which seats to a similarly chamfered portion of metallic seal 12 having an axial bore 13 of the same inner diameter as tube 1 so that the bore 13 is in axial alignment with tube 1. Seal 12 is disposed within housing 8 in cavity 14 in the forward face of slot 10 opposite opening 9 in housing 8. Housing 8, in axial alignment with cavity 14, has a circular passage 15 from the forward face of cavity 14 through housing 8. Seal 12, in this embodiment, has a series of circular concentric serrations 16 surrounding bore 13 which oppose, in housing 8, similar concentric serrations 17 on the face of cavity 14 and surrounding passage 15.

Tube 2 is threadedly engaged to collar 18 which is rotatably mounted in gland 19 similar to tube 1 and gland 5. Gland 19, by a series of external threads, is in turn in threaded engagement in housing 8 with threaded hole 20. Further, tube 2 has chamfered portion 21 which seats to a similarly chamfered portion in housing 8 of passage 15, so that passage 15 is axially aligned with tube 2.

Tube 1 is insulated from tube 2 and housing 8 by insulator 22, which has an opening 23 for gland 5, insulating block 7 from housing 8, by cylindrical insulator 24 insulating seal 12 from housing 8 and by circular insulator and gasket 25 insulating seal 12 and housing 8, and sealing the axially aligned circular hole formed by the inner surfaces of tubes 1 and 2, passage 15 in housing 8, and bore 13 in seal 12. Circular insulator and gasket 25 has an axial hole 26 which, when insulator and gasket 25 is fully compressed, forms a hole the same diameter as the inner diameter of tubes 1 and 2, thereby completing the axially aligned continuous hole of constant diameter from tube 1 to tube 2 through coupling 3.

Figure 3:
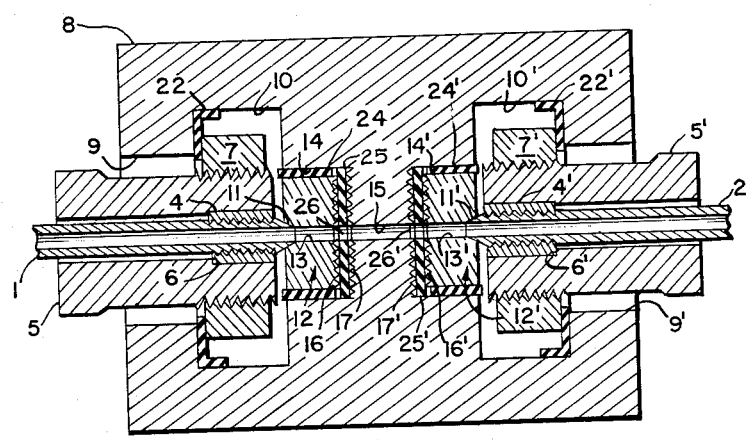
FIGURE 3 is a sectional view of another insulated tube coupling embodying this invention.

While the above described embodiment provides substantial insulation of tubes 1 and 2, additional insulation may be provided by insulating tube 2 from housing 8 in the same manner as tube 1, as illustrated in FIGURE 3. In FIGURE 3, tube 1 is connected to housing 8 in the same manner as illustrated in FIGURES 1 and 2. The additional insulation is provided by connecting tube 2 to housing 8 with a duplicate assembly composed of a block 7' and insulator 22' in slot 10' and seal 12', cylindrical insulator 24', insulator and gasket 25', gland 5' and collar 6' in opening 9'. Seal 12' and housing 8 have opposing circular concentric serrations 16' and 17'. The continuous hole of constant diameter between the inner surface of tubes 1 and 2 is thus provided by bore 13, passage 15, bore 13' and the holes 26 and 26' in gaskets 25 and 25'.

Coupling 3 is assembled by first sliding gland 5 over and past the threaded end of tube 1. Collar 4 is screwed on the threaded end of tube 1 and gland 5 then slid over collar 4 and against the rearward face 6 thereof. Insulator and gasket 25 followed by seal 12 and cylindrical insulator 24 with serrations 16 of seal 12 facing forward, are then inserted into cavity 14 of housing 8. Block 7 is inserted in slot 10 along with insulator 22 and centered therein. Gland 5, together with tube 1 and collar 4, is inserted through opening 9 and insulator 22 and threaded through block 7 so as to seat chamfered portion 11 of tube 1 to the similarly chamfered portion of seal 12. Gland 5 is then tightened forcing seal 12 forward so as to join the serrations of seal 12 and housing 8 through insulator and gasket 25 by the reverse pressure of block 7 against the rearward face of slot 10 through insulator 22. Neither tube 1, collar 4, seal 12, nor housing 8 rotate when gland 5 is threaded through block 7, thereby preventing any wear on insulator and gasket 25, cylindrical insulator 24, or insulator 22. In FIGURE 3, both tubes 1 and 2 are connected to housing 8 in this same manner.

Gland 19 is then slid over and past the threaded end of tube 2. Collar 18 is screwed on the threaded end of tube 2 and gland 19 slid over collar 18 in the same manner as gland 5 and collar 4. Gland 19 is threaded into hole 20 in housing 8 so as to seat chamfered portion 21 of tube 2 to the similarly chamfered portion of passage 15 of housing 8. The inner surfaces of tubes 1 and 2, bore 13 of seal 12, passage 15 of housing 8, and the axial hole 26 of insulator and gasket 25 form an axially aligned circular hole of constant diameter.

The hole formed at these surfaces being continuous and of constant diameter defines a passage for high pressure gases or liquids which is free of turbulence caused by discontinuities on the surfaces of prior tube couplers. Further, insulator and gasket 25, cylindrical insulator 24, and insulator 22 provide for the electrical insulation of tube 1 from tube 2 and housing 8. Insulator and gasket 25 at the same time seals the coupling from leakage. Further yet, by the action of the rotatably mounted collars 4 and 18 in glands 5 and 19, respectively, the chamfered portions of tubes 1 and 2, seal 12, and housing 8, together with insulator and gasket 25, insulator 22, and cylindrical insulator 24 are protected from wear by the absence of any rubbing motion between any of these parts, thereby extending the life of each. Also, the novel and unique combination of elements of the invention provides a simplified tube coupling apparatus which can be assembled or disassembled with ease on site.

The invention can be used to join two vessels enclosing any gas or liquid at high pressure and/or temperature, such as water at saturation temperature and at pressures including and above 2000 p.s.i. It can be used to electrically isolate pressure lines from test equipment in which any turbulence caused by discontinuities in the line would cause the test equipment readings to be in error with the actual parameters being measured.

It will be understood that various changes in the details, materials, steps, and arrangements of the parts, which have been herein described and illustrated in order to explain the nature of the invention may be made by those skilled in the art within the principle and scope of the invention as expressed in the appended claim.

What is claimed is:

1. A tube coupling adapted to connect and electrically insulate the opposed adjacent ends of first and second axially aligned metallic tubes, the combination comprising;
   (a) a metallic housing having an axial opening through said housing and a slot perpendicular to the axis of said housing and communicating with said opening,
   (b) a metallic seal disposed within said opening, said seal having a circular axial opening the same diameter as the inside diameter of said tubes,
   (c) a metallic block disposed within said slot, said block having an internally threaded opening aligned with the opening in said housing,
   (d) a metallic collar threadedly engaged to an end of said first tube,
   (e) a metallic gland rotatably mounted around said collar and in threaded engagement with said block, said gland having a flat annular surface disposed in opposition to the rearward face of said collar so as to axially align said first tube with openings in said seal and in said housing,
   (f) means for connecting said second tube to said housing in axial alignment with the opening in said housing and
   (g) means for insulating said seal and said block from said housing so as to form a continuous axially aligned passage of constant diameter between the inner surfaces of said tubes.

2. In the tube coupling described in claim 1 wherein the abutting portions of said seal and said housing are serrated.

3. In the tube coupling described in claim 1 wherein said second tube connecting means comprises a second set of seal, block, collar, gland and insulating means disposed in said housing opening and a second slot in said housing in the same manner as parts (a), (b), (c), (d), (e) and (g) of claim 1 connects said first tube to said housing.

References Cited by the Examiner
UNITED STATES PATENTS

| | | | |
|---|---|---|---|
| 1,919,654 | 7/33 | Hofmann | 285—332 |
| 2,366,010 | 12/44 | Dies | 285—332 |
| 2,837,351 | 6/58 | Bailey | 285—52 |
| 2,918,312 | 12/59 | Filstrup | 285—50 |

CARL W. TOMLIN, *Primary Examiner.*